United States Patent [19]

Flygstad et al.

[11] 4,447,836
[45] May 8, 1984

[54] RECORDING APPARATUS FOR CASSETTE COPYING

[75] Inventors: Dean W. Flygstad, St. Paul; Bill H. Wehrmacher, Prior Lake, both of Minn.

[73] Assignee: Telex Communications, Inc., Minneapolis, Minn.

[21] Appl. No.: 424,788

[22] Filed: Sep. 27, 1982

Related U.S. Application Data

[63] Continuation of Ser. No. 144,441, Apr. 28, 1980, abandoned.

[51] Int. Cl.$^3$ .......................... G11B 5/86; G11B 15/18
[52] U.S. Cl. ..................................... 360/15; 242/200; 360/92
[58] Field of Search .................... 360/15, 91, 92, 96.2, 360/96.1; 242/197–200, 203

[56] References Cited

U.S. PATENT DOCUMENTS

| | | | |
|---|---|---|---|
| 3,620,476 | 11/1971 | Cervantes | 360/15 |
| 3,677,554 | 7/1972 | Smith et al. | 360/15 |
| 3,744,803 | 7/1973 | Bazzy | 360/15 |
| 3,751,042 | 8/1973 | Platt | 242/200 |
| 3,850,386 | 11/1974 | Zimmermann | 242/203 |
| 4,222,083 | 9/1980 | Tronzano | 360/92 |

*Primary Examiner*—Stuart N. Hecker
*Attorney, Agent, or Firm*—Peterson, Palmatier, Sturm, Sjoquist & Baker, Ltd.

[57] ABSTRACT

A type cassette copier on which; pairs of aligned "floating" head and pinch roller arms are pivotally mounted within a housing adjacent pairs of aligned cassette receiving recesses and are simultaneously pivotable by a resilient connection to control lever arm; the control lever arm is operable through rewind, copy control and off positions; the head arms are operably connected to a drive mechanism for selectively driving rotatable spindles disposed in each cassette receiving compartment; the drive mechanism is adapted to be pivoted by the head arms for engagement of one magnetic clutch or another disposed on adjacent paired spindles, with one engaging position for rewind, and another for copying; a lever escapement cam, engaged by the free end of the control lever arm holds the lever arm in rewind or copy positions during each operation; a pair of electric motors drive the spindles and adjacent capstans through suitable belt drive means disposed in series with each motor; the motors are electrically connected in series with a source of current through means including a suitable servo system requiring only one velocity sensing means; a reciprocating head arm actuator is electrically operable between rewind and copy modes of each operation; tapered plastic fasteners are engaged in tapered colleted holes to removably mount various elements in place; and the head arms, motors and reading and recording heads are cyclable in sequence to rewind, record, rewind and stop.

17 Claims, 16 Drawing Figures

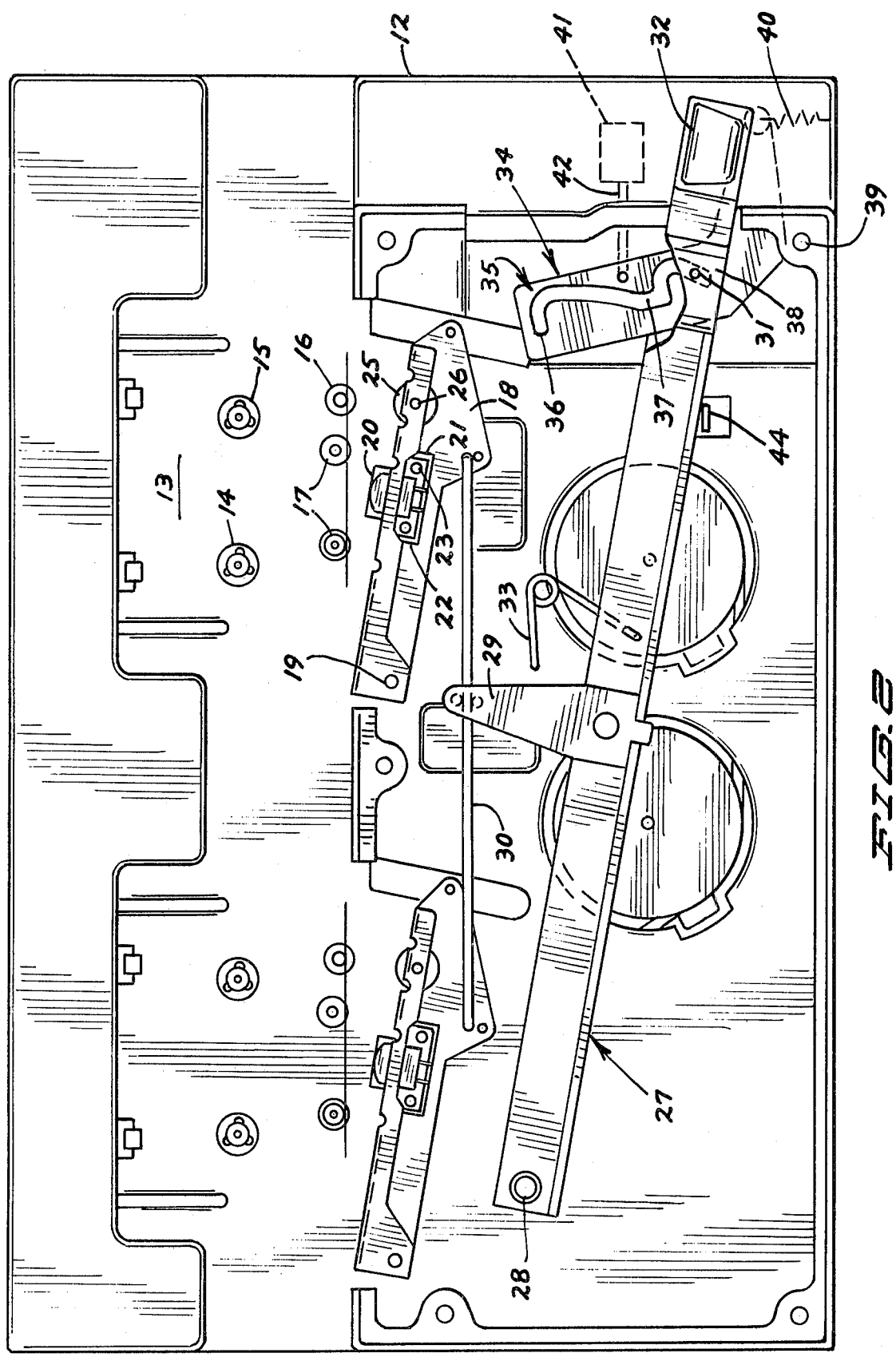

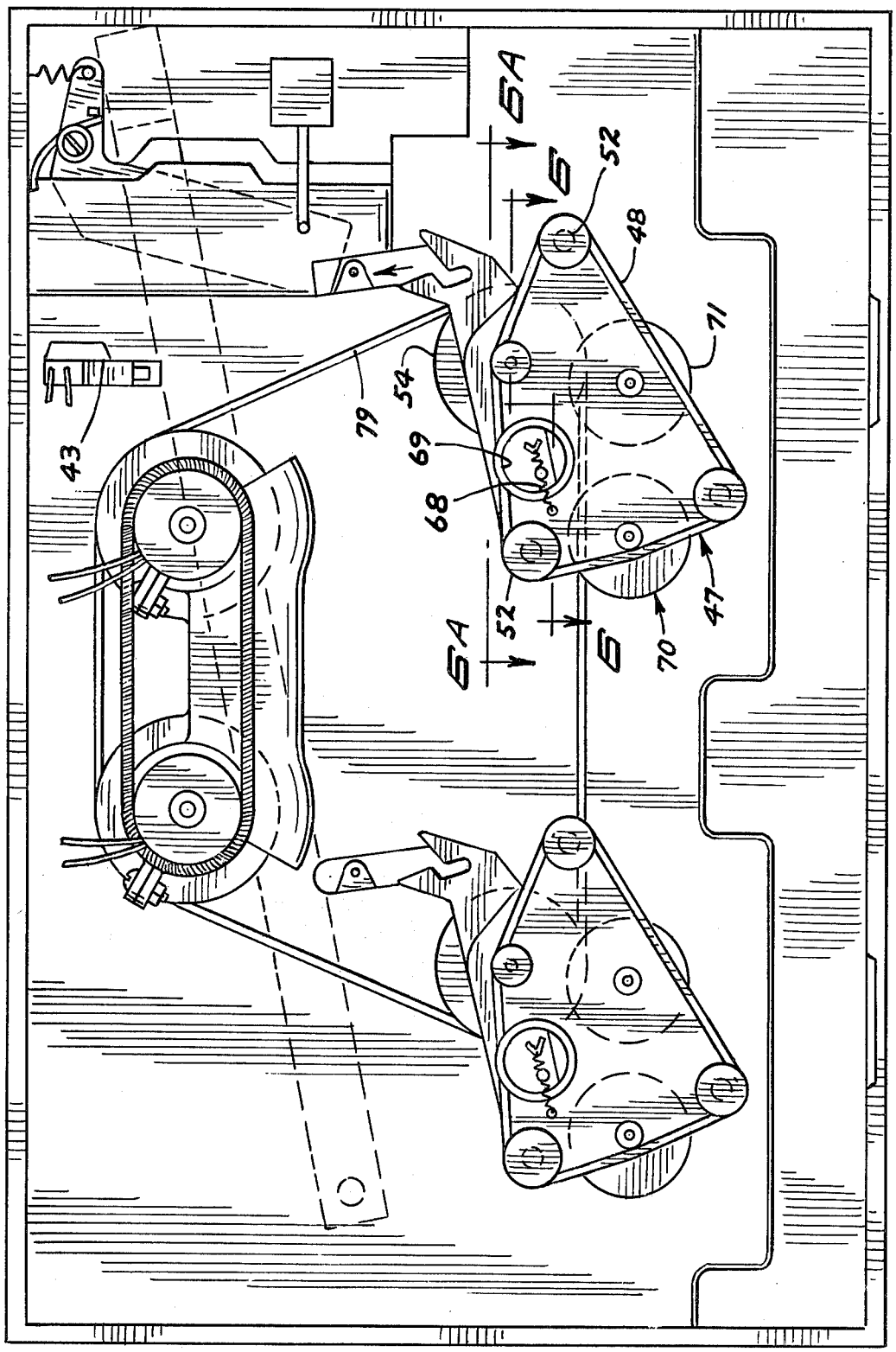

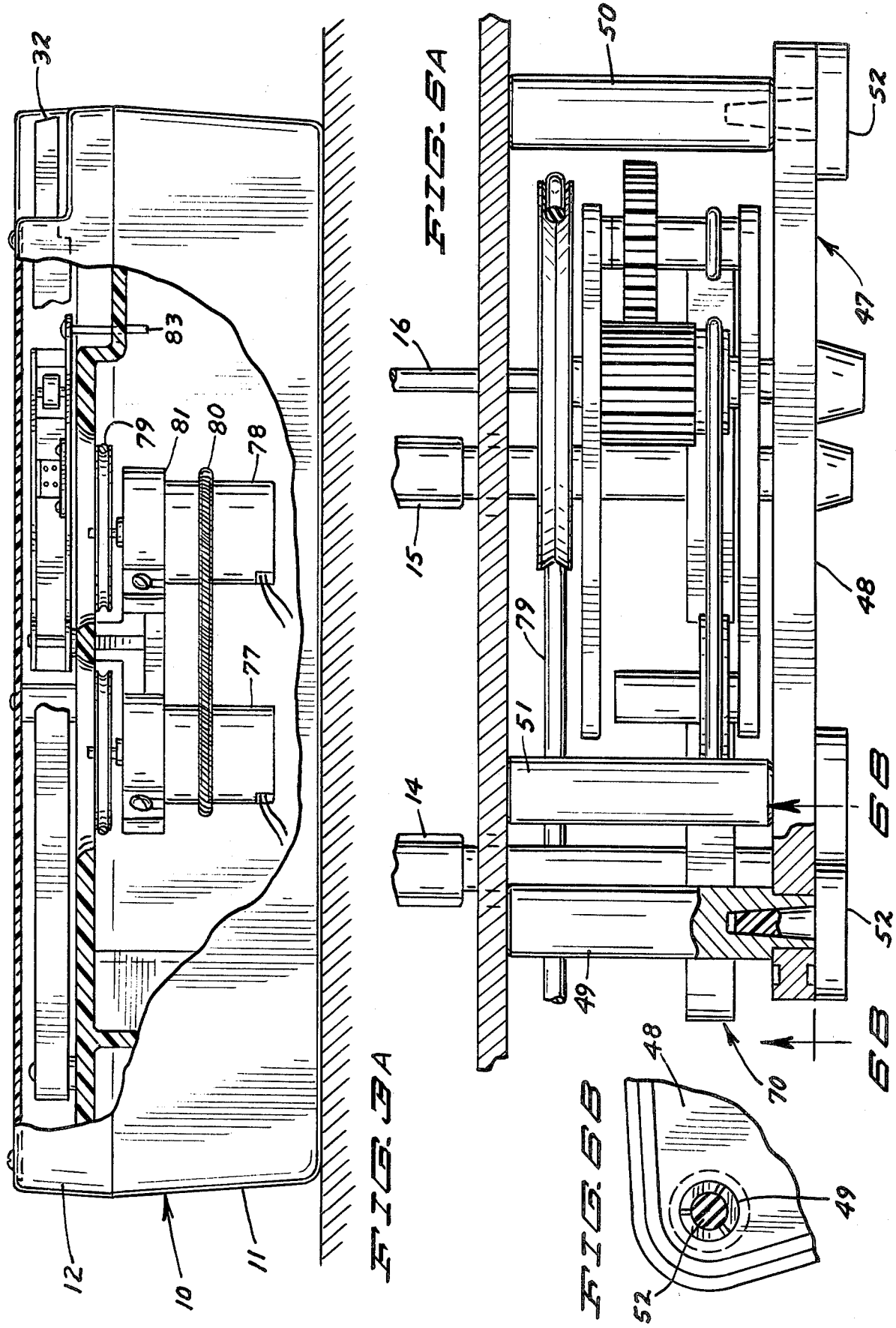

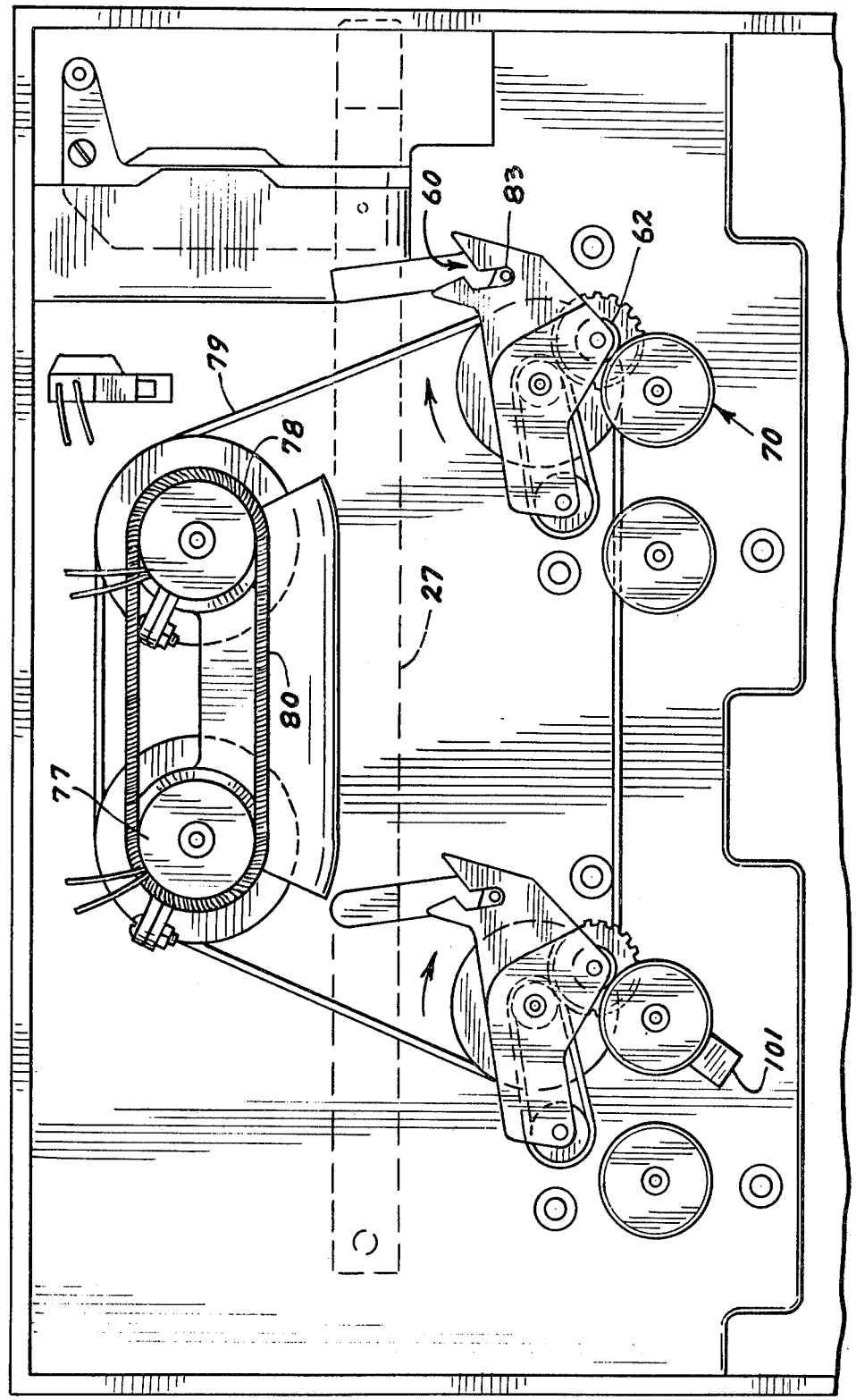

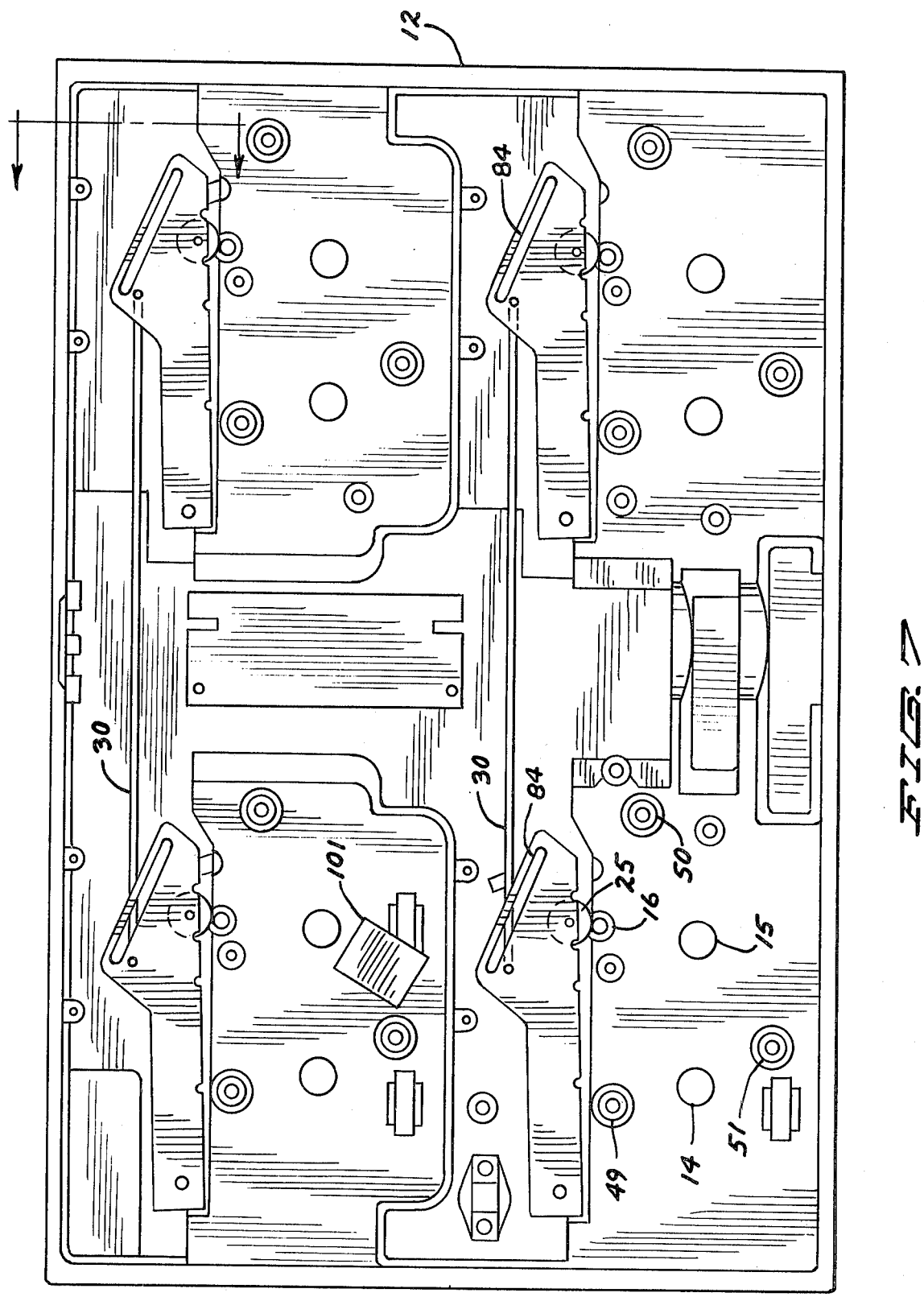

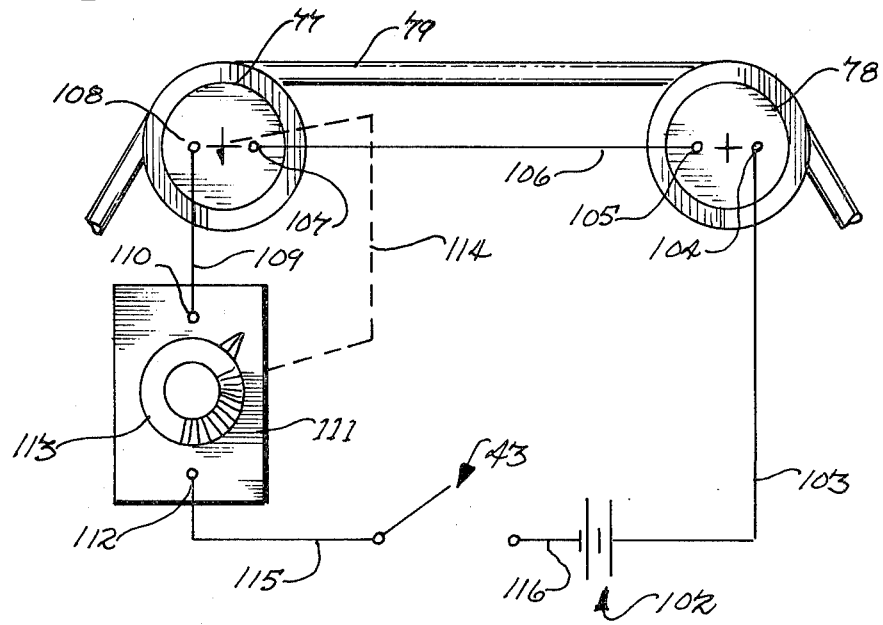

RECORDING APPARATUS FOR CASSETTE COPYING

This is a continuation of application Ser. No. 144,441, filed April 28, 1980, now abandoned.

BACKGROUND OF INVENTION

This invention relates to sound recording devices, and more particularily to apparatus for recording sound from one tape cassette to one or more other cassettes.

Equipment has been developed for transferring recorded sound from one tape to another. A master cassette previously recorded is inserted into such equipment along with one or more blank cassettes, and the sound recorded on the master is then transferred to the blank cassette. One problem, however, has been to achieve trouble free sound transfer, with a minimum of distortion.

SUMMARY OF THE INVENTION

In accordance with this invention there is provided apparatus for tranferring recorded sound from one tape cassette to another comprising a housing having pairs of aligned compartments for receiving tape cassettes, and pairs of aligned head arms pivotally mounted on the housing adjacent the cassette receiving compartments, one of the head arms is provided with a reading head and the other a recording head. The head arms further include pinch rollers and are pivotally connected to one another by a resilient rod. A control lever arm is pivotally mounted adjacent the head arms and is connected to the resilient rod connecting the head arms so that pivoting of the lever arm will cause simultaneous pivoting of both head arms into operative relationship with tape cassettes positioned in the cassette receiving compartments. A lever escapement is disposed within the housing adjacent the free end of the control lever arm. The escapement has a slot for receiving a slot following pin to hold the lever arm in rewind, copy, end rewind, and off positions. Means are further provided for moving the escapement slot so as to allow the following means of the lever arm to move to the various positions on the escapement.

A pair of rotatable spindles are mounted on shafts vertically disposed within each cassette receiving compartment or recess, a capstan is rotatably mounted adjacent each pair of spindles for driving tape in the cassettes. A clutch means comprising driving and driven members is mounted on the housing for engaging each spindle such that a limited amount of rotary force can be transmitted through the clutch to the spindles, with means being provided for alternately driving one of the clutch driving members of each spindle pair and then the other, to accomplish rewind and take-up of the tape in a cassette. A pair of electric drive motors are connected electrically and mechanically in series, and utilize a single tach servo control system for rotating the driving members of the clutch assemblies and the capstan of each cassette receiving compartment.

A second embodiment of this invention permits transferring of recorded sound simultaneously from one tape cassette to two or more tape cassettes, such apparatus comprises a housing having at lease two spaced apart rows of aligned pairs of cassette receiving compartment, substantially the same as those described above, with a pair of aligned head arms pivotally mounted on the housing adjacent each row of cassette receiving compartments, one of the head arms having a reading head and the other having recording head. Each pair of head arms are pivotally connected to one another by a resilient rod, as described above. A lead screw moves the resilient connecting rod of each pair of head arms such that each head arm can be simultaneously pivoted into reading or recording relationship with master and blank tape cassettes positioned in the cassette receiving compartments. Rotatable spindles, capstans, clutch means, and means for driving the driving members of the clutch assemblies, as described above, are further provided for transmitting rotary motion to the spindles and capstans.

It is a primary object of this invention to provide appartus for more efficiently transferring recorded sound from one tape cassette to one or more other cassettes.

It is another object of this invention to provide sound transferring apparatus having "floating" heads which can be simultaneously brought into contact with cassette tapes to insure distortion free transfer of recorded sound from one cassette to another.

It is another object of this invention to provide sound transferring apparatus having a unique lever arm and cam arrangement for trouble free rewind, copy, end rewind and stop operations.

It is a yet further object of this invention to provide apparatus having a magnetic clutch for assuring a constant force on the rewind or take-up spindles, to thereby eliminate tape breakage during copy or rewind operations.

It is further object of this invention to provide apparatus operable by a pair of direct current electric drive motors connected in electrical and mechanical series relationship and controlled by a single tach servo control mechanism.

It is a still further object of this invention to provide apparatus having a drive mechanism utilizing plastic parts, including tapered plastic "nails" securing the parts to tapered collet like apparatus on the housing, such that the apparatus can be inexpensively manufactured and maintained.

It is yet another object of this invention to provide apparatus having self-energizing means for insuring smooth tranistian of the drive mechanism from copy to rewind operations.

BRIEF DESCRIPTION OF THE DRAWINGS

FIG. 2 is a top plan view of the apparatus of FIG. 1 with a portion of a cover removed;

FIG. 3 is a bottom view of the top portion of the apparatus shown in FIGS. 1 and 2;

FIG. 3A is a side elevation, partly broken away, view of the apparatus of FIGS. 1 and 2;

FIGS. 4 and 5 are bottom views of the apparatus of FIGS. 1, 2 and 3 with a portion of the mechanism removed for clarity and in different positions of operation during the cycle of operation of our invention;

FIG. 6A is a further partially broken away sectional view taken along Section Line 6A—6A in FIG. 3;

FIG. 6B is a sectional view taken along Sectional Line 6B—6B in FIG. 6A;

FIG. 7 is a bottom view of a further embodiment of our invention;

FIG. 8 is a like bottom view of the apparatus shown in FIG. 6 with additional drive mechanism;

FIG. 13 is a diagrammatic-electrical schematic drawing illustrating the relationship of the mechanical and electrical aspects of the illustrative embodiment of FIGS. 1–6, inclusive.

DESCRIPTION OF THE ILLUSTRATED EMBODIMENTS

Figure 1:
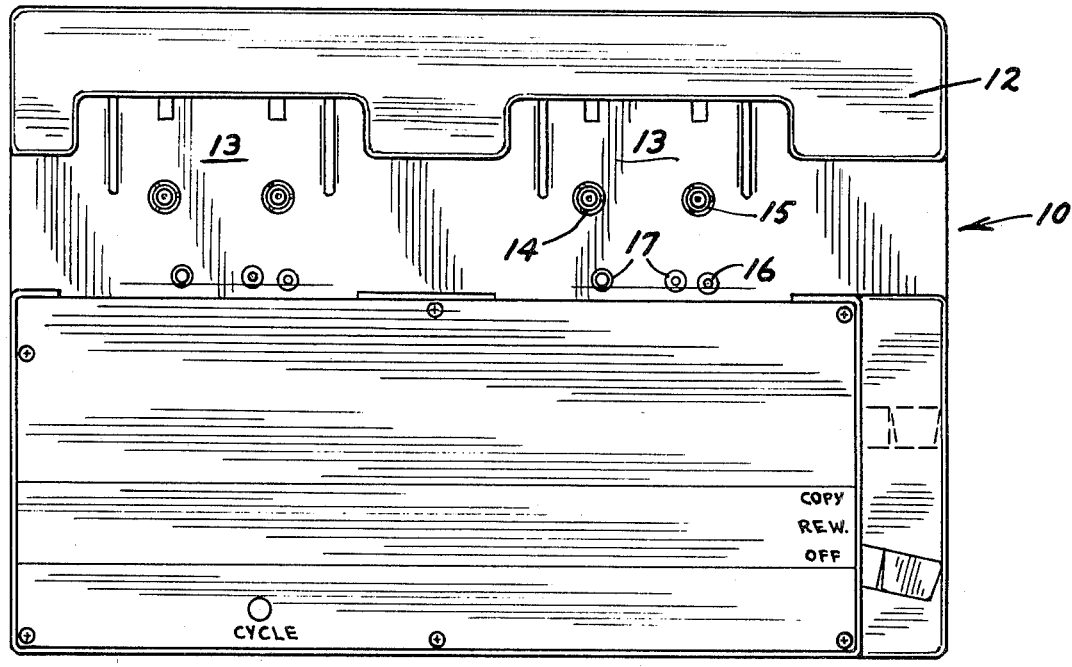
FIG. 1 is a plan view of a tape cassette reproducing or copying apparatus embodying the principles of our invention.
Figure 6:
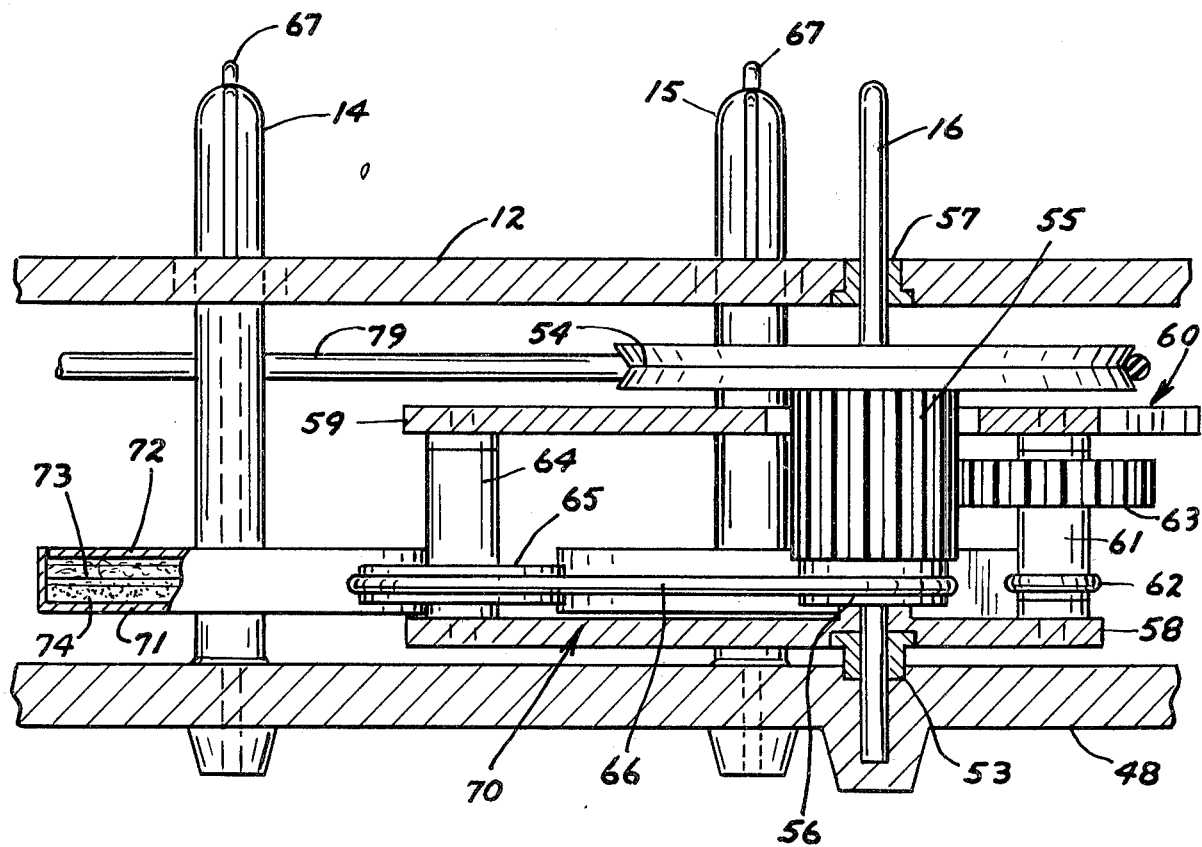
FIG. 6 is a partially broken away side view taken along Section Line 6—6 of FIG. 3.
Figure 4:
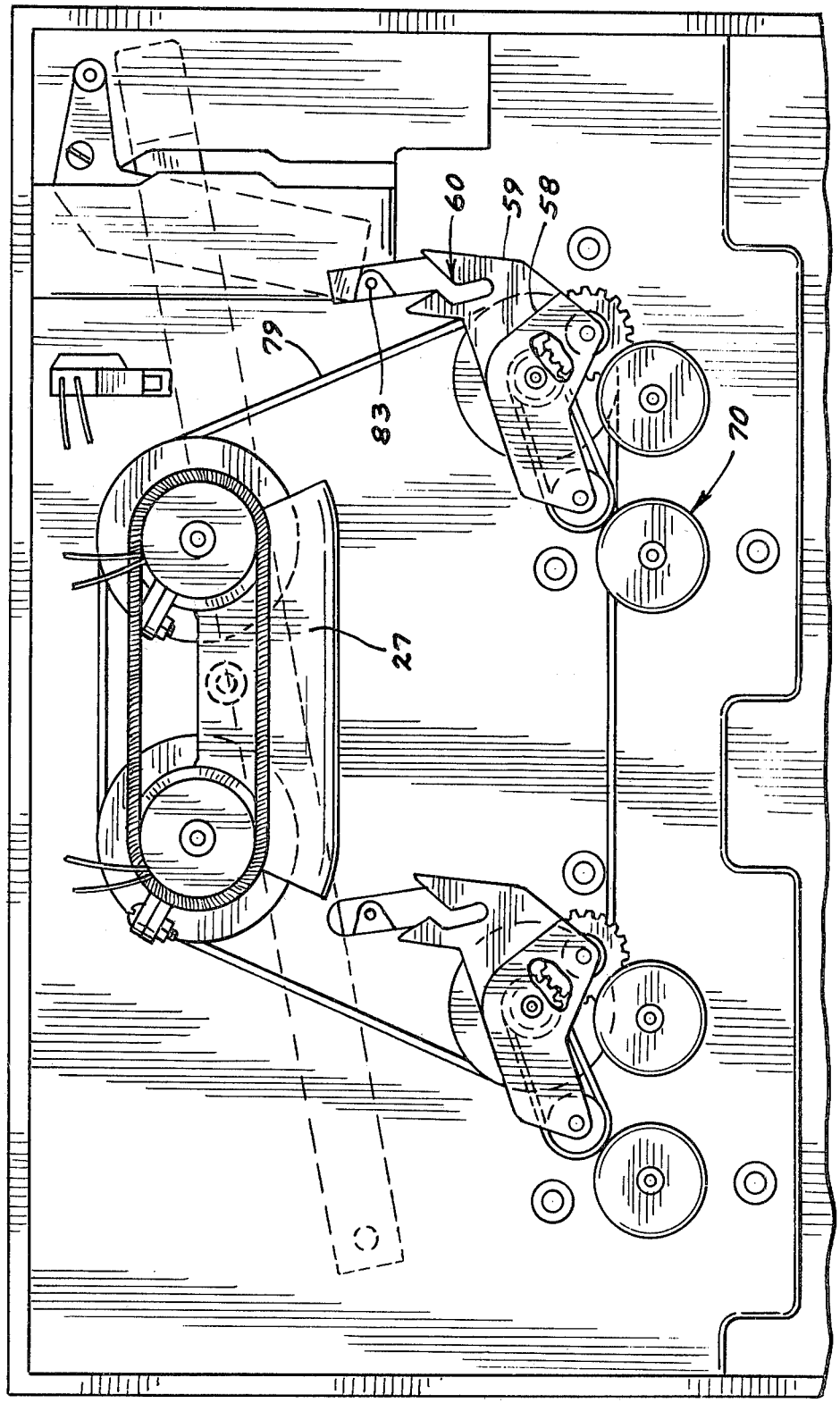

Referring to FIGS. 1–6B, inclusive, of the drawings, a tape cassette reproducer or copier is indicated generally by reference character 10 and includes a bottom, rectangular hollow housing portion 11 and a top, cover-chassis portion 12. In view of the like elements utilized in numerous locations of our tape cassette copying apparatus, like reference numerals have been applied where practicable and, where duplication occurs within an illustration, duplicate reference numerals have been omitted for the sake of clarity.

Top-chassis 12 includes a plurality of recesses 13 for receiving and retaining tape cassettes for the purpose of reproducing the recording present on a master cassette to one or more other blank or unrecorded cassettes. Each recess is provided with a pair of drive spindles 14 and 15 disposed in appropriate locations to receive the center portions of the tape reels contained in a cassette, a drive capstan 16 to engage a tape and drive it so as to cause tape motion at a suitable recording speed and a pair of cassette locating pins identified by reference character 17. It may be appreciated at this point that the illustrated embodiments of all of the figures of the drawings present pairs of recesses 13, the purpose of which will become apparent from a further consideration of the elements of our invention.

A head and pinch roller bracket or arm 18 and a spindle-capstan drive assembly 47 are disposed adjacent each of cassette recesses 13 and in operable relationship with the spindles, capstan and cassette, when present in a recess. A control lever arm 27 is operable to control the disposition of head and pinch roller arms 18 which in turn are operable to control the operation of spindle-capstan drive assembly 47.

Head and pinch roller arm 18 is shown rotatably disposed on a pin 19 that is stationarily mounted on the top surface of chassis 12. A tape head 20, having tape guides 98, is shown mounted in a head mounting 21 that is disposed on top of a spring 22 that is in turn pivotally disposed on top of a pivot portion thereof 96, in a recess, therefor, 100 on the bottom portion of arm 18, and is adjustably disposed in such position by screw numbers 23 and 24. A pinch roller 25 is rotatably disposed on a pin 26 extending through the top and lower portion of arm 18.

A control arm 27 is shown pivotally disposed on a pin 28 that is stationarily disposed and extending upwardly from the top of chassis 12. Control arm 27 includes a connected actuator portion 29 that is in turn connected to a resilient connector member 30 at its center portion and which is further connected, at each end, to a like portion of head-pinch roller arms 18. Control arm 27 is further biased into the position shown in FIG. 2 through the use of a suitable spring, 33 connected at one end to the chassis and the other end to a portion of control lever arm 27. An escapement cam element 34 is provided with a slot 35 that includes a position 36 for the copy mode of operation, a position 37 for a rewind mode of operation and a position 38 for an "off" position of operation. Escapement 34 is rotatably disposed on a pin 39 that is stationarily mounted to extend upwardly from chassis 12. Escapement 34 is biased into lateral engagement with escapement pin 31 on control lever arm 27 by a tension bias spring 40. Escapement 34 is also connected to a solenoid 41 through an operator 42 so that it may be rotated in a counterclockwise direction (as viewed on FIG. 2 of the drawings) to disengage escapement pin 31 from the several positions of operations of our tape copying apparatus. An on-off control switch 43 is shown disposed on chassis 12 and includes an actuator 44 extending upwardly into proximity to the location of control lever arm 27 when in the position shown on FIG. 2 of the drawings.

Spindle-capstan drive assembly 47 includes a base 48 that is disposed on three posts 49, 50 and 51 extending from chassis 12 and is held in place by three tapered pins which extend into the end of posts 49, 50 and 51 so as to coact with and be retained by a colleted tapered hole in the ends of such posts. The taper of the pins and the holes in the posts is preferably that of a number 2 Morse taper. Capstan 16 is shown journaled in bearing 53 on base 48 and includes a drive pulley 54, a gear 55, and further pulley 56, and through a capstan bearing 57 disposed in chassis 12. A lower rewind and take-up base 58 is rotatably disposed on capstan 16 and is configured to coact with an upper rewind take-up base 59 that is configured to rotate therewith about the axis capstan 16. Upper base 59 includes an open ended tapered slot 60 for purposes to be described below. A take-up drive shaft 61 having a puck 62 and gear 63 is disposed and rotatably mounted in registering journals between lower and upper bases 58 and 59. Gear 63 on take-up shaft 61 is operable to engage gear 55 on capstan 16 and pulley 65 on rewind shaft 64 is connected to pulley 56 on capstan 16 through a suitable belt 66. Spindles 14 and 15 are shown rotatably disposed on spindle shafts 67, each of which are stationarily disposed and extend upwardly from base 48. A biasing spring 68 is connected intermediate base 48 through aperture 69 to lower base 58 to bias lower base in a counterclockwise direction to, as will be explained below, maintain the spindle drive assembly in a rewind state.

Each of these spindles 14 and 15 are attached at their lower end to the driven end 72 of a spindle clutch 70. Driven end 72 is comprised of a disc of magnetic material that is rotatably disposed on spindle shaft 67 on top of a driving member 71 shown in the form of an open ended cylindrical cup-like member which contains a quantity of magnetic material near its lower end and which may frictionally drive driven end 72 through a washer-like frictional producing member, such as felt. First and second drive motors 77 and 78 are shown disposed on a suitable mount 81 that is stationarily dependent from chassis 12. Motors 77 and 78 each include appropriate pulleys that are shown in operable engagement with successive portions of a drive belt 79 that extends intermediate the motors and the pulleys 54 on capstans 16.

As shown in FIG. 13, drive motors 77 and 78, each having suitable pulleys, are disposed in mechanical serial relationship with drive belt means 79. A source of power 102 is shown connected in series with drive motors 77 and 78 through conductor 103, terminals 104 and 105 on motor 78, conductor 106, terminals 107 and 108 on motor 77, conductor 109, terminal 110 on speed controller 111, terminal 112, conductor 115, single pole single throw switch 43 and conductor 116. Controller 111 may be provided with a suitable dial 113 for speed control and is also shown connected to drive motor 77 through suitable driving means 114.

As will be explained in more detail with the operation of our apparatus, each of the head and pinch roller arms 18 have a downwardly depending pin 83 affixed to the free end that is adapted to engage and coact with tapered slot 60 in upper bases 59.

Figure 9:
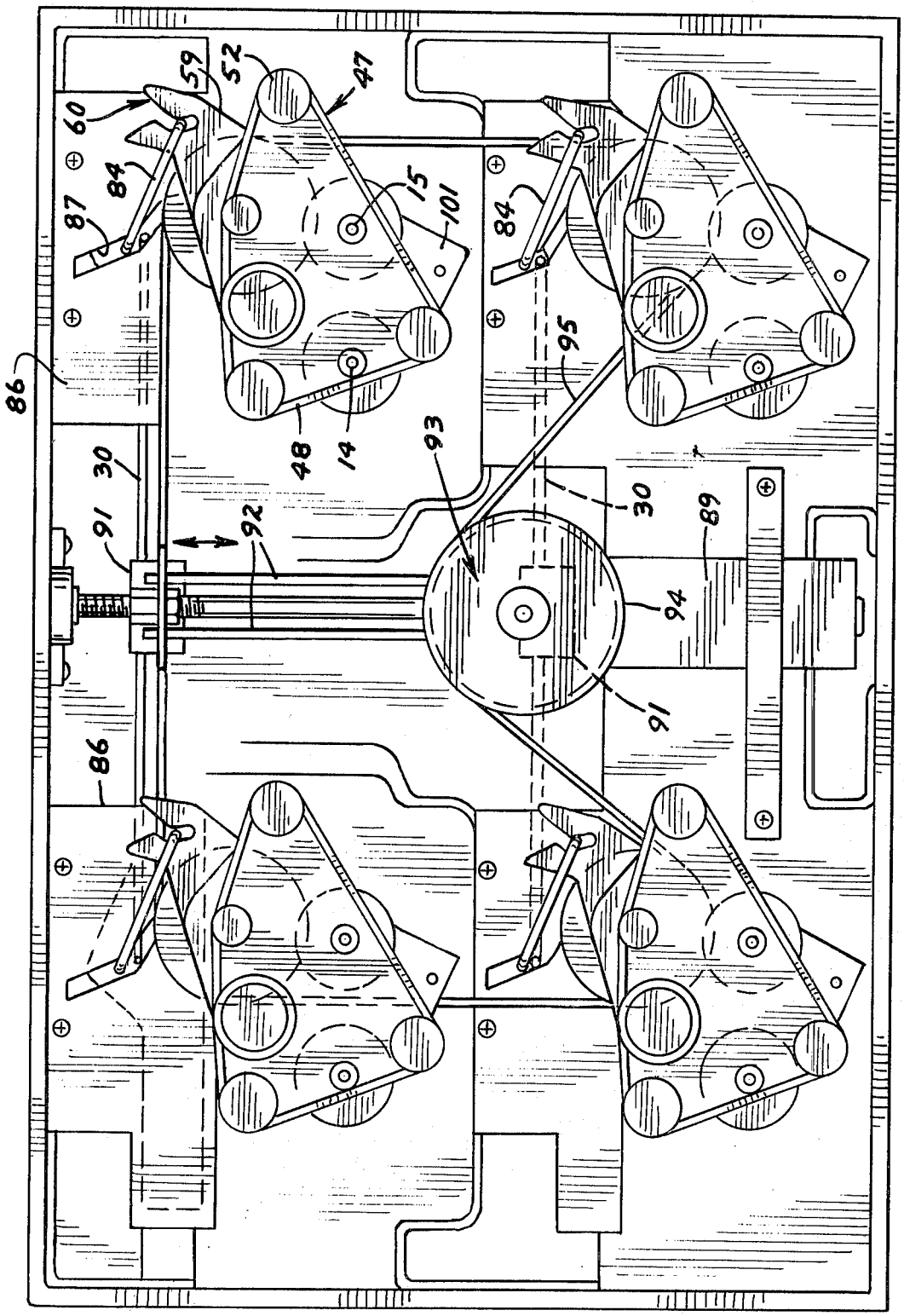
FIG. 9 is an enlarged fragmentary view illustrating the relationship of some of the elements of FIGS. 7 and 8.
Figure 9:
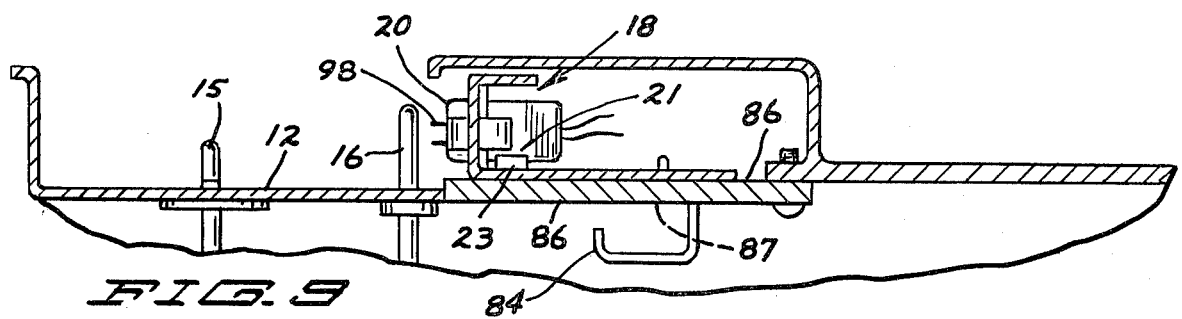
Figure 10:
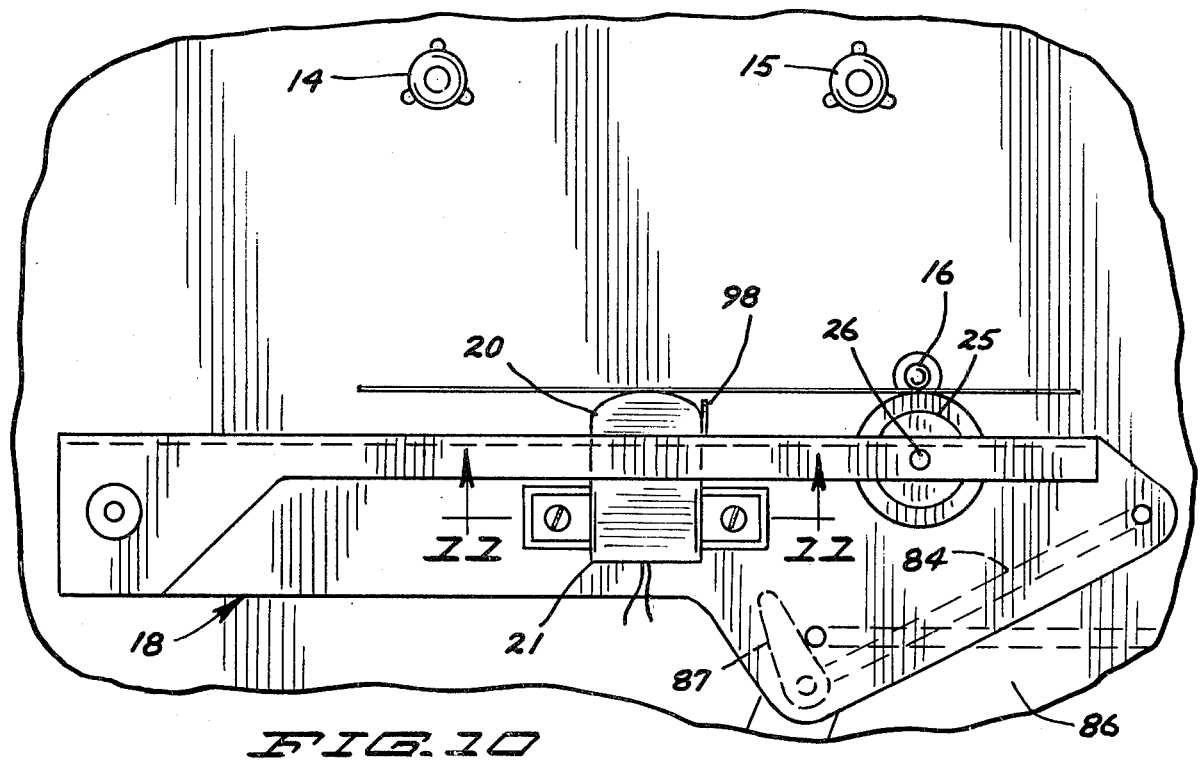
FIG. 10 is an enlarged top fragmentary view of a portion of the apparatus of FIGS. 7 and 8.
Figure 11:
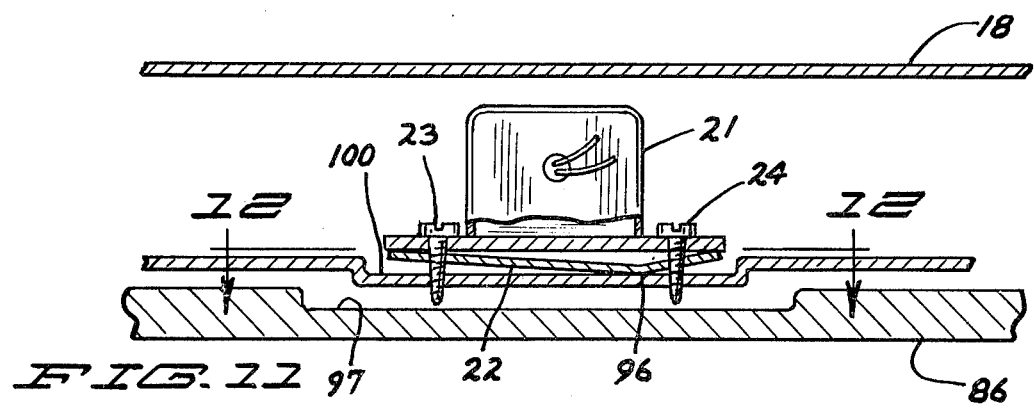
FIG. 11 is an enlarged fragmentary view taken along Section Line 11—11 on FIG. 10 of the drawings.
Figure 12:
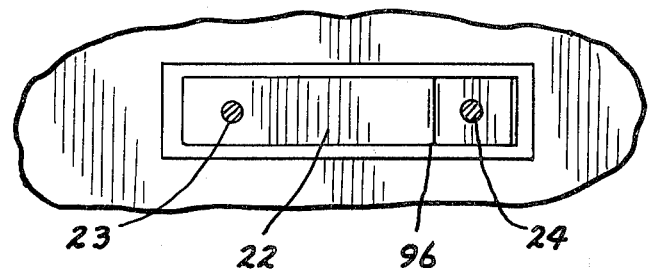
FIG. 12 is a fragmentary section view taken along Section Line 12—12 on FIG. 11 of the drawings.

Referring to FIGS. 7-12, inclusive, an apparatus having two pairs of cassette receiving recesses 13 contains like elements where denoted by like reference characters with respect to the embodiment described above. Additional features shown disposed on chassis 12 include a plurality of substantially rectagular sub chassis 86 each of which is provided with a recess 97 underneath the area in which the head mounting portion of head-pinch roller arm 18 is operative and a slot 87 to allow unrestricted movement of an actuator pin 84 shown in the form of a U-shaped member, as in FIG. 9, that is adapted to coact with tapered slot 60 in upper base 59.

The embodiment of FIGS. 7-12 also includes a motor 89 that is stationarily disposed underneath chassis 12 and is connected to and drives a lead screw 90 upon which a nut 91 is disposed for travel thereon. Nut 91 is held against rotation by a pair of guide members 92 which are suitably held against rotation around lead screw 90 by suitable means (not shown) which allow for reciprocatory action so that connection may be made to resilient connectors 30, as shown at the top portion of FIG. 8 and which may likewise be suitably connected to a further resilient head arm connector 30 disposed intermediate the other pair of head arms 18 on FIG. 7. Further, a suitable drive motor 93, having a pulley 94, is connected to drive pulleys 54 on capstans 16 through an appropriate belt 95.

Both of the illustrated embodiments may be operated by suitable electrical control means (not shown) which provide for energization of the drive motors and the tape heads in any manner believed to lie within the skill of an appropriately experienced technician. One need only bear in mind that the speed of the capstan drive motors must be maintained at the limits of the state of the art and this may be done by use of appropriate servo systems that may include the use of a velocity sensing tachometer generally provided integral with the drive motors themselves and the energization of the drive motors may be controlled as in the case of the first embodiment by a suitable switch 43 responsive to the position of control lever arm 27 or by suitable manual switching means in the case of the second embodiment. The motor operations for lead screw motor 89 in the second embodiment may be controlled by suitable limit switches (not shown) as the location of same is not critical when one considers the resiliency of resilient connectors 30 that are utilized to transmit forces to head and pinch roller arms 18, taking into account the sequencing of positions that is required by the sequence of operations of our apparatus as will be set forth below. It may also be desirable to provide a conventional "end of tape" source of signal to indicate the attainment of a complete rewinding of all of the cassettes present in the recesses in the apparatus.

Furthermore, in the apparatus of the first illustrated embodiment, it may be well to understand the sequential operational aspects that may be provided for either manually or, electro-mechanically or electrically as may be desired. In the first embodiment, switch 44 may be actuated by movement of the control lever arm from its rest or off position or may be a manual switch which simply is used to energize motors 77 and 78. This provides the motive power for the rewind and copying modes of operation. In the rewind mode of operation the rewind spindles of the cassettes are rotated in a direction to rewind the tapes in all of the cassettes and the control lever arm is in a rewind position as in FIG. 4 at which the head-pinch roller arms are retracted from engagement with the tape in the cassette and the tape and the capstans so as to allow for free motion of the tape at an accelerated speed. When the tapes have been rewound, an "end of tape" or "spindles stopped" signal may be derived from the rewind spindles through suitable means (not shown) to provide a signal that may be used to alert an operator that the operation has been completed or, as in the case of the first embodiment, energize a solenoid to move the escapement to a position that it will release the control lever arm to its next lower position, in this case an off position. Similarly when the control lever arm has been moved to its topmost or copy position, an "end of tape" or "spindle stopped" source of signal may be used to again either indicate to the operator that the copy operation has been completed or, as may be accomplished with the first embodiment, provide a signal to the solenoid release for the escapement to allow the control lever arm to assume the rewind position, so that the rewinding of the cassette is accomplished automatically. The control of the interconnections to the read and recording-erase heads (not shown) may also be responsive to control means (not shown) that is operated from the signals used to control the rewind and copy mode tape handling functions or may be controlled, simply, manually by the use of appropriate switches. In all cases it is considered to be within the skill of those familiar with tape recording and reproducing to provide visual or audible signals to an operator to indicate the status of operation of the apparatus. It may be also noted that the spindle drive assemblies 47 are normally biased to a position to drive the rewind spindle at all times that the drive motors are running except during the copy mode of operation at which time the head-pinch roller arm causes actuation to a take-up spindle driving position.

In connection with the second illustrated embodiment, again utilizing apparatus that is understood to be within the capabilities of one skilled in the art of tape recording and reproducing, and using such suitable devices and apparatus (not shown) a typical operation would contemplate that the illustrated embodiment have an at rest or off position in which all of the head-pinch roller arms are in their retracted position and the lead screw operator is likewise in its off or at rest position with lead screw 91 at its lowermost position near the bottom of FIG. 8 and all of the head-pinch roller arms 18 are rotated in a counterclockwise direction from that shown on FIGS. 7 and 8. It must be remembered that, during this mode of operation of spindle drive assembly 47 a rewind mode of operation is in effect. Therefore, when an off-on switch is closed to energize the apparatus, the lead screw will first drive nut 91 to its lowermost position and drive motor 93 will be energized to supply motive force to the capstans and to the spindle drive assembly to cause a rewind operation to take place. At the end of the rewind operation as may be sensed by end of tape or stopped tape sensors 101, a signal may be provided that may be used to energize motor 89 to drive lead screw 90 in a reverse direction to cause nut 91 to assume the copying position shown in FIG. 8. When the next end of tape or stopped spindle signal is received motor 89 is driven in a reverse direction to again place the apparatus in a rewind mode of operation which continues until the next end of tape or stopped spindle signal is present and this may be used to deenergize the apparatus. The control of the reading and recording-erase heads and the operation of the spindle drive assemblies may be the same as noted above.

It may now be clear to those familiar with the art to which our invention concerns that other modifications and embodiments using the principles of our invention may be effected without departing from the spirit and principles fairly discernable from a consideration of this description.

OPERATION OF THE FIRST EMBODIMENT

Referring to FIGS. 1-6B, inclusive, a cartridge to be copied is placed in the upper right hand recess in FIG. 2 and a cessette to be recorded is placed in the upper left hand recess and control lever arm 27 is moved counterclockwise to the first rewind position indicated by reference character 37 on escapement 34. This initiates operation of motors 77 and 78 and the apparatus is in the position indicated on FIG. 4 of the drawints with rewind belt 66 in engagement with clutch driving member 71 to cause rotation of spindle 14 in a direction to cause rewind of the tape within the cartridge. It may also be noted at this point that the relationship of the elements of spindle drive assembly 47 is such that the driving of clutches 70 by rewind belt 66 or take-up puck 62 is "self-energizing" in the sense that the relative dimensions and direction of rotation, when taken in context of the positions of the elements, provides a sure and rapid driving engagement when switching from one mode of operation to the other. When rewind has been attained an end of tape signal is received a signal is applied to the coil winding of solenoid 41 to move escapement 34 in a counterclockwise direction to release control lever arm 27 to allow it to move to its initial off position and to indicate to the operator that the cassettes are now ready for the recording operation. The recording operation is established by again moving control lever arm 26 in a counterclockwise direction so that pin 31 moves up slot 34 past rewind position 37 and into copy position 35. It will remain so until an end of tape signal is again received and energization of solenoid 41 will again rotate escapement 34 in a counterclockwise direction to release pin 31 and allow control lever arm 27 to assume the rewind position described above at which point the cassettes will be rewound until an end of tape signal is again received which will again energize solenoid 41 to allow control lever arm 27 to assume its off position. Reference to FIG. 3 of the drawings will indicate that biasing spring 68 serves to maintain rewind belt 66 on spindle drive assembly 47 in engagement with it associated clutch driving member 71 and that during the recording mode of operation, as illustrated in FIG. 5, pin 83 engages tapered slot 60 on upper base 59 to desengage the rewind belt and to engage puck 60 on take-up shaft 61 with driving member 71 on spindle 15 to perform the conventional take-up function, again, driving through magnetic spindle clutch 70. When an end of tape signal has again been generated, the solenoid is energized to again release control lever arm 27 from escapement 34 to allow it to assume its off position and, in the illustrated embodiment, to de-energize the apparatus by actuation of switch 43. Considerable latitude, and indeed simplicity, may be achieved by virtue of the fact that the reading and recording-erase heads are only in contact with the tape during the copy mode of operation and thus their associated conventional reproducing and recording devices may be energized at all times during the time the overall apparatus is in an on condition of operation.

OPERATION OF THE SECOND EMBODIMENT

As may now be appreciated, the second embodiment is suseptible to a greater variety of cycling controls because it does not require manual operation.

In the apparatus of the second embodiment, like elements are operated similarly and for the sake of review, the inter-relationship between the head-pinch roller arms and the spindle drive assemblies remains the same, the interaction between adjacent pairs of head-pinch roller arms, remains the same and the operation of the spindle drive assemblies remains the same. Motor 89 and lead screw 90 and the associated connections to resilient connectors 30, intermediate adjacent pairs of head arms 18, through lead screw 91 provide the same two mode operation. It may be appreciated that the operation of motor 89 provides essentially a two position operation wherein nut 91 is driven between two extremes of positions, one for a copy mode and the second for a rewind mode. Controlling motor 89 to accomplish this function may easily be accomplished by utilizing a pair of limit switches and a current reversing function so that when motor 89 is stopped when nut 91 has reached one or the other of its extremes of operation, an automatic reversal for the next operation will be in effect. The operation of motor 89 and primary drive motor 94 may be controlled by a suitable sequencer that is responsive to signals derived from end of tape sensors 101 so that a typical overall mode of operation would include an operator initiating a cycle of operation by actuating a switch which energizes motor 94 and motor 89 to drive nut 91 to its rewind or uppermost position (FIG. 7). After the rewind operation is completed and sensed by end of tape sensor 101 motor 89 will again be energized in a reverse direction to assume the position shown in FIG. 7 whereat head arms 18 are in operative tape driving and signal transferring positional relationship until an end of tape signal is generated. At this time motor 89 again drives in a reverse direction to reposition nut 91 at its uppermost, rewind position, spindle drive assemblies automatically assume their rewind position and the tapes on all of the cassettes are rewound until a further end of tape signal is generated at which point the entire apparatus is turned off.

Referring to FIGS. 9-12, the elevation and azimuth of head 21 to satisfactorily position it with respect to the tape encountered in a cassette in position in recesses 13 of the apparatus is easily effected by the adjustment of mounting screws 24 and 23. The elevation is adjusted by rotating mounting screw 24 while the azimuth is adjusted by rotating screw 23 and it will be noted that fulcrum portion 97 of resilient lever 22 is disposed substantially beneath the right hand edge of head 21 as viewed on FIG. 11. It is clear that fulcrum 96 may be positioned adjacent the left edge and the same operation obtained.

Further, should disassembly be of portions of our tape copier prove necessary, it may also be appreciated that the ease of withdrawl of plastic "nails" 52 from the colleted apertures in the bottom of posts 49, 50 and 51 provides a rapid and effecient disassembly and reassembly while providing a highly secure mounting.

These and other modifications may occur to those skilled in the art and it is understood that our invention is as described in the appended claims.

We claim:

1. In tape rerecording apparatus of the class including at least one reversible master tape drive and at least one reversible recording tape drive, each of said drives including a moveable tape head, the combination comprising:
   moveable tape head mounting means, adapated to receive a tape head, disposed adjacent to a master and recording tape in said drives and operable between tape engaging and retracted positions with respect to said tape; and
   drive means, including resilient connecting means intermediate the tape head mounting means in said master and recording tape drives, operable to simultaneously, resiliently move the tape head into data transferring engagement with said tapes.

2. The apparatus of claim 1 in which the drive means includes means for equalizing the force of engagement of the tape heads with the tape.

3. The apparatus of claim 2 in which the means for equalizing the force of engagement of the tape heads includes the resilient connecting means.

4. The apparatus of claim 3 in which the resilient connecting means is comprised of an elongated member of material exhibiting spring-force characteristics to transmit a tape engaging force to each of the tape heads from a source and from one tape head to another.

5. The apparatus of claim 1 in which the master and recording tape drives include means responsive to the position of drive means and to the tape head drive means to control the reversible operation thereof.

6. The apparatus of claim 5 in which the master and recording tape drives are normally operable to rewind a tape disposed thereon.

7. The apparatus of claim 1 in which the master and recording tape drives are operatively connected to a single source of drive energy comprised of at least two motor means.

8. In tape handling apparatus of the class wherein a plurality of tapes are processed simultaneously at a plurality of tape drive locations, a source of motive power comprising, in combination:
   first and second motor means;
   single belt drive means operatively connected to each of a plurality of tape drive means; and
   means connecting each of said motor means to said single belt drive means.

9. The apparatus of claim 8 in which one of the motor means includes velocity control means.

10. The apparatus of claim 9 in which the motor means are serially connected to the drive means.

11. Drive means for tape handling apparatus of the class including forward and reverse drive spindles each adapted to receive a tape reel and a capstan for controlling the velocity of a tape disposed on said reels, the combination comprising:
    a chassis having a plurality of mounting posts;
    a drive frame member stationarily disposed on said mounting posts parallel to and spaced apart from said chassis;
    a tape capstan rotatably journaled in said chassis and said drive frame and extending through said chassis for driving engagement with a tape;
    forward and reverse tape reel drive spindles rotatably disposed parallel to said capstan and on shafts therefor, said shafts being disposed on said drive frame at one end and extending through said chassis at the other end; and
    tape reel drive means driven by end rotatably disposed on said tape capstan intermediate said drive frame and said chassis, said reel drive means being operable in one position to driveably connect said forward tape reel drive spindle to said capstan and in another position to connect said reverse tape reel drive spindle to said capstan.

12. The apparatus of claim 11 in which the tape reel drive means is resiliently biased toward driving engagement with said reverse tape drive spindle.

13. The apparatus of claim 12 in which the tape reel drive means is operably connected to a means for disposing a tape head and a pinch roller in engagement with a tape for actuation thereby into driving engagement with the forward tape spindle.

14. The apparatus of claim 11 in which each of the drive spindles includes a slip clutch means.

15. The apparatus of claim 14 in which the slip clutch means includes magnetic friction producing means.

16. The apparatus of claim 11 in which the mounting posts include tapered apertures on the ends adjacent the drive frame member and similarly tapered pins extend therethrough into frictional engagement with said apertures.

17. The apparatus of claim 16 in which the mounting posts are provided with axially extending slots adjacent the aperatures.

* * * * *

UNITED STATES PATENT AND TRADEMARK OFFICE
CERTIFICATE OF CORRECTION

PATENT NO. : 4,447,836

DATED : May 8, 1984

INVENTOR(S) : Dean W. Flygstad, et al

It is certified that error appears in the above-identified patent and that said Letters Patent is hereby corrected as shown below:

In the Abstract, line 5, after "to", insert --a--.

Column 2, line 32, after "is", insert --a--.

Column 10, line 29, delete "end" and substitute --and--.

Signed and Sealed this

Eighteenth Day of September 1984

[SEAL]

Attest:

GERALD J. MOSSINGHOFF

Attesting Officer

Commissioner of Patents and Trademarks